United States Patent [19]

Weible

[11] 4,116,018

[45] Sep. 26, 1978

[54] UNIVERSAL JOINT

[75] Inventor: Warren W. Weible, Defiance, Ohio

[73] Assignee: The Zeller Corporation, Defiance, Ohio

[21] Appl. No.: 723,770

[22] Filed: Sep. 16, 1976

[51] Int. Cl.$^2$ .................................................. F16D 3/30
[52] U.S. Cl. ........................................ 64/12; 64/11 B; 64/21
[58] Field of Search .................. 64/12, 13, 11 R, 11 B, 64/21

[56] References Cited

U.S. PATENT DOCUMENTS

| | | | |
|---|---|---|---|
| 539,161 | 5/1895 | Almond | 64/13 |
| 1,414,411 | 5/1922 | Herreshoff | 64/11 R |
| 1,537,790 | 5/1925 | Alpe | 64/13 |
| 1,569,989 | 6/1923 | Leipert | 64/11 R |
| 1,574,301 | 2/1926 | Masury | 64/13 |
| 1,602,912 | 10/1926 | Leipert | 64/12 |
| 1,605,356 | 10/1926 | Leipert | 64/12 |
| 1,657,844 | 1/1928 | Smith | 64/12 |

Primary Examiner—Benjamin W. Wyche
Assistant Examiner—R. C. Turner
Attorney, Agent, or Firm—Allen D. Gutchess, Jr.

[57] ABSTRACT

A universal joint is provided, and more specifically a constant-velocity type of universal joint particularly for use in a drive train of a front wheel drive vehicle. The universal joint resembles a flexible bellows-type of joint as viewed from the side in elevation but is made primarily of elongate elements which are placed in tension to transmit torque from one shaft to another. The body of the universal joint has at least two large diameter portions and a smaller diameter portion therebetween with the elongate element extending diagonally in both directions between the peripheries of the large diameter portions to provide torque transmittal in both directions. The universal joint preferably is produced from a continuous flexible element which is moved transversely or back and forth beyond two circular core members which are positioned coaxially and spaced apart a distance equal to that of the large diameter portions of the universal joint. The circular members are then rotated as the elongate element is moved back and forth to provide the diagonally-extending bridging elements or lines and also form anchor portions or chords at the outer faces of the circular members. The crossing points of the bridging lines form the small diameter portion of the universal joint.

11 Claims, 8 Drawing Figures

UNIVERSAL JOINT

This invention relates to universal joints and especially to constant velocity universal joints for front wheel drive vehicles.

Universal joints of the Cardan type have been long-known in the art. These have been commonly used at both ends of the long propeller shaft located between the transmission and the differential of conventional rear-drive vehicles. With a single joint of this type, when the shafts associated therewith are at angles to one another, the angular velocity is not always constant. This renders Cardan type joints unsuitable for front wheel drives, unless used in pairs. However, there is seldom sufficient room in the length of the drive train for front wheel drives to incorporate pairs of such universal joints.

Constant velocity universal joints suitable for front wheel drives have long been known in the art. Such joints basically comprise a splined ball and a matching socket which enable torque to be transmitted between shafts angularly-misaligned with constant angular velocity. Such universal joints however, have been expensive to make, being difficult to machine, and also requiring great precision. In addition, such joints have other shortcomings such as deteriorating rapidly if subjected to dirt.

Another type of constant velocity universal joint that is known in the art is referred to as the bellows type. The bellows universal joints are made of thin flexible metal, of bellows shape, often with the two connected shafts having a ball and socket arrangement within the bellows at the center to prevent axial offset of the shafts relative to one another. Another type of constant velocity universal joint similar to the bellows type is of tubular configuration, usually made of rubber and sometimes reinforced with a metal bellows within the rubber wall. These joints are also sometimes reinforced with fibers or wires arranged in a helix or a spiral, as shown in U.S. Pat. No. 3,628,352, for example. These bellows and tubular universal joints have met with limited commercial success, if any, apparently because of their inability to transmit sufficient torque, because of a limited service life, or both.

The new constant velocity universal joint according to the invention has a number of advantages over those heretofore known. It has an exceptional ability to transmit torque and to provide long service, even under severe conditions. It is also almost substantially maintenance free and is not affected by dirt or other contaminants. Further, no intricate machining or machines are required to produce the new universal joint. In addition, the new joint has another advantage in that it can be made in a variety of sizes and of different constructions so as to be able to replace a wide variety of existing universal joints.

The new constant velocity universal joint includes a body having large diameter portions with a smaller diameter portion therebetween to give an appearance similar to a bellows. However, the new universal joint essentially comprises elongate elements are placed substantially in tension as torque is transmitted between two shafts which are connected to the new universal joint.

The elongate elements which constitute the body of the new constant velocity universal joint preferably are coated with a suitable binder material which also adheres to other elements to help maintain them in fixed positions. However, the elongate elements do not simply serve to reinforce a matrix material as in the aforementioned tubular universal joints but actually directly transmit the torque between the connected shafts. In a preferred form, the elongate elements are made of graphite fibers which are particularly strong in tension, exhibit a high degree of fatigue resistance, and are capable of stretching.

In the preferred production of the universal joints according to the invention, a core is first provided which comprises at least two circular members with means positioning them in coaxial relationship and spaced apart at positions corresponding to the large diameter portions of the universal joint. The core is then rotated as the elongate element is wound thereon, being controlled by a suitable level wind device to move the element back and forth over the circular members. The elongate element can be coated as it is fed from a suitable source through the level wind device and to the core. The circular members of the core can then remain a part of the universal joint or can be removed if sufficient coating material is applied to the elongate elements to provide a functionally-integral body at the large diameter portions of the universal joint.

It is, therefore, a principal object of the invention to provide a constant velocity universal joint that has a long life and is less expensive than constant velocity universal joints heretofore known.

Another object of the invention is to provide a constant velocity universal joint that is less affected by dirt or other contaminants.

A further object of the invention is to provide a constant velocity universal joint that can be used to replace existing constant velocity universal joints.

Yet another object of the invention is to provide a universal joint primarily comprised of elongate elements which transmit torque from one shaft to another by the elements being placed directly in tension.

Yet a further object of the invention is to provide a unique method for making a universal joint.

Many other objects and advantages of the invention will be apparent from the following detailed description of preferred embodiments thereof, reference being made to the accompanying drawings, in which.

Figure 1:
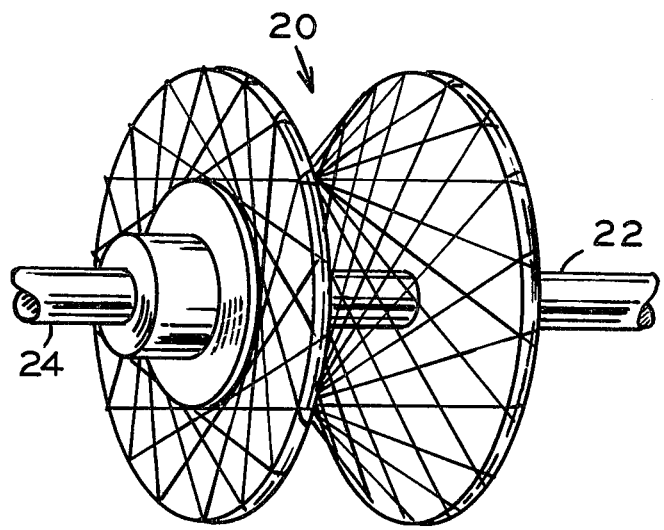
FIG. 1 is a somewhat schematic view in perspective of a constant velocity universal joint according to the invention connecting two shafts.
Figure 3:
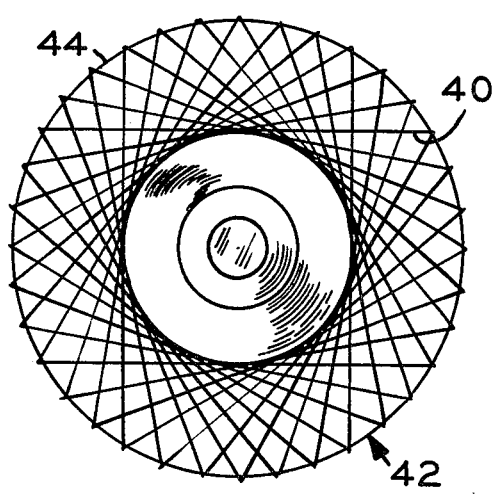
FIG. 3 is an end view in elevation of the universal joint of FIGS. 1 and 2.
Figure 2:
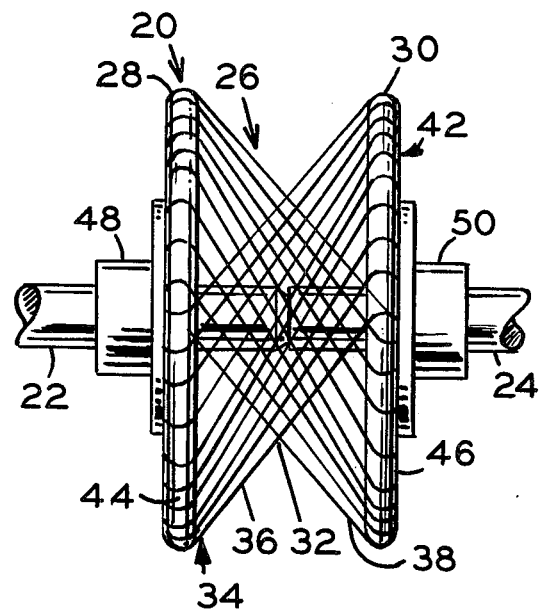
FIG. 2 is a front view in elevation of the universal joint of FIG. 1.

Referring particularly to FIGS. 1–3, a universal joint embodying the invention is indicated at 20 and is shown as connecting two shafts 22 and 24 to enable torque or power to be transmitted from one shaft to the other even if the shafts are angularly misaligned. Even under those conditions, both shafts rotate uniformly at all times, unlike single Cardan universal joints which are in common use. While the use of Cardan universal joints in pairs largely overcomes this problem, often there is not sufficient space in the drive train to use two such joints and, in any event, they add to the cost and to maintenance problems, also increasing friction and reducing efficiency.

The new universal joint 20 can be made in a wide variety of sizes and constructions to be used in a wide variety of applications and also to serve as replacement universal joints for a wide variety of existing constant velocity universal joints. The joint design is also suitable for low volume industrial universal joints because the joint can be readily made in limited quantities. The universal joint 20 includes a body 26 having two large diameter portions 28 and 30 and a smaller diameter portion 32 located therebetween. The body 26 consists essentially of a coated, elongate element 34 which is preferably continuous and extends around the large diameter portions 28 and 30 and diagonally therebetween. The elongate element 34 includes first diagonally bridging portions or lines 36 which extend in one direction between peripherally offset or displaced points of the large diameter portions 28 and 30, and bridging portions or lines 38 which extend in the opposite direction between peripherally offset or displaced points on the large diameter portions 28 and 30. The adjacent ones of the lines 36 and 38 cross at angles which are symmetrical with the axis of the shafts 22 and 24, when aligned. The points of crossing of the lines 36 and 38 form the small diameter portion 32 of the body 26. The portion 32 does not necessarily have a true diameter since the cross points of the lines do not necessarily form a true circle as viewed in transverse cross section. The element 34 also includes anchor portions or chords 40 connect the bridging portions outside the large diameter portions. The anchor portions 40 serve to connect the bridging lines 36 and 38 but, if the elongate element 26 were not continuous, the bridging lines 26 and 38 could be anchored or affixed to the large diameter portions 28 and 30 and the chords 40 then eliminated entirely. The lines 36 and 38 transmit torque between the shafts 22 and 24. When they are angularly misaligned, the lines alternately are placed more in tension and tend to stretch where the large diameter portions 28 and 30 are spaced farther apart and are relaxed where the portions are closer together during rotation of the shafts.

The body of the joint can be formed by winding the elongate element 34 on a core 42. The core 42 includes two circular members or discs 44 and 46 positioned at locations corresponding to the large diameter portions 28 and 30 of the universal joint 20. The core also includes means for holding the circular members 44 and 46 in those positions with such means, in this instance, including suitable flange members 48 and 50 which connect the circular members to the shafts 22 and 24. The shafts in turn can be held by suitable chucks or the like to position and rotate the circular members 44 and 46, with the rotation occuring while the elongate element 34 is wound on the members, as will be discussed in more detail subsequently.

The shafts used to support the circular members may not be the actual shafts used with the universal joints. In that instance, the temporary shafts are removed after the universal joint body 26 is produced and the actual shafts employed with the joint can then be connected therewith.

The elongate element 34 can be made of a number of different materials having suitable strength in tension. In a preferred form, the element constitutes graphite fibers which are strong in tension, are fatigue resistant, and can stretch. Such graphite elements are commercially available in tows or untwisted yarn consisting of 2,000, 5,000, or 10,000 fibers or filaments in cross section.

The elongate element 34 is preferably coated with a suitable material to aid in holding the element in place by adhering to the coating of other portions thereof. By employing a sufficient amount of the coating material, e.g. an epoxy resin and a hardener, or SMC material, particularly at the large diameter portions 28 and 30, enough structural integrity can be achieved for the universal joint body 26 to produce structural rings. In that case, the circular members 44 and 46 of the core can be removed or eliminated after the body 26 is formed. The strength of the rings can be increased by winding lines around the peripheries of the members 44 and 46 before the element 34 is wound thereon with the peripheral lines then remaining as part of the rings after the members 44 and 46 are removed. If the circular members or rings are somewhat yieldable, the element 34 need not stretch as much when the shafts 22 and 24 are angularly misaligned. Of course, the chords 40 in that instance must also have sufficient coating so as to provide a structural annular web between the large diameter portions 28 and 30 and the flange members 48 and 50 or other suitable means employed to connect the body 26 with the shafts 22 and 24.

Figure 4:
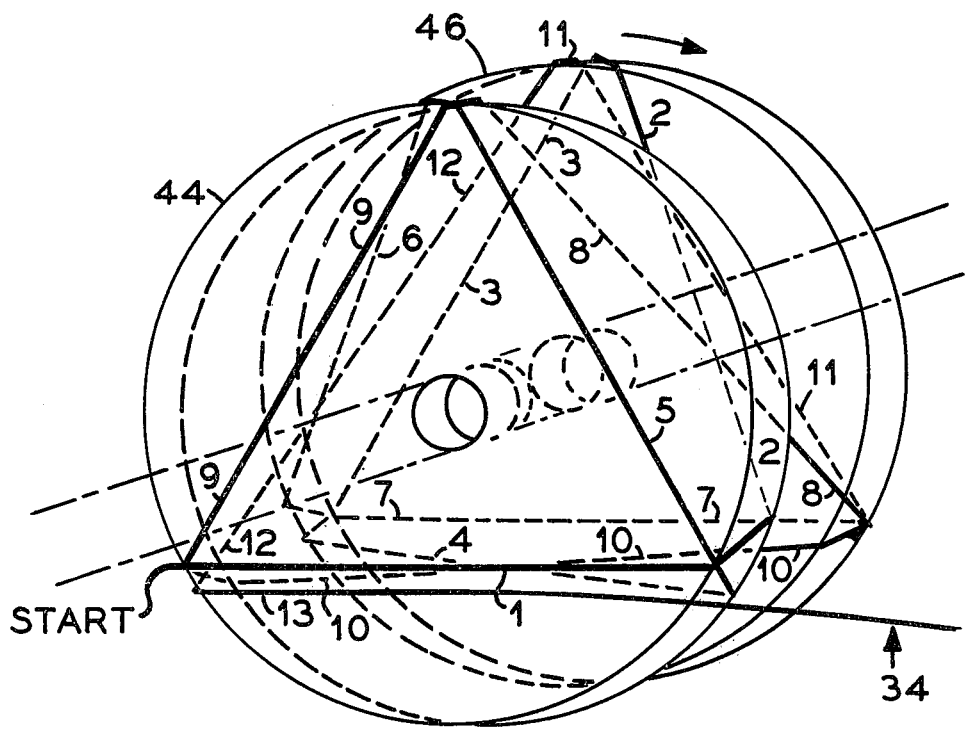
FIG. 4 is a diagrammatic view in perspective showing an elongate element and the manner in which it is wound on to two spaced circular members when producing the body of the universal joint of FIGS. 1–3.

FIG. 4 shows more explicitly the manner in which the universal joint body 26 can be produced from the continuous elongate element 34. In this instance, the circular members 44 and 46 constituting part of the core have squared peripheral edges for purposes of illustration rather than round ones, as shown in FIG. 2. The circular members 44 and 46 are rotated in a clockwise direction, as viewed in FIG. 4, and the elongate element 34 is guided toward the circular members 44 and 46 from the right.

The end of the element 34 can first be anchored to the edge of the circular member 44 at the point labeled "START". The members are then rotated while the element 34 is moved back and forth between a point just to the left of the circular member 44 and a point just to the right of the circular member 46.

The element 34 first forms one of the anchor portions or chords 40 which is designated "1" in FIG. 4, and the element then extends across the thickness of the circular member 44 and forms a bridging portion or line 36 designated "2". The element then forms another chord designated "3" on the outer surface of the circular member 46 and then extends back to the first circular member 44 to form a bridging line designated "4".

With continued relative motion between the circular members and the elongate element, the element then sequentially forms a chord "5", a bridging line "6", a chord "7", a bridging line "8", a chord "9", a bridging line "10", a chord "11", and finally, a bridging line "12" extending back from the member 46 to the member 44 at a point near the "START" location on the member 44, in this instance.

Continued motion of the circular members and the element then produced another "set" of the twelve bridging portions and anchor portions starting with another anchor chord "13". The element 34 is guided so that each of the twelve chords and lines of the next "set" will be peripherally uniformly spaced from the corresponding previously-formed chords and lines of the first "set" by a short distance which is substantially equal to the distance between the "START" location of the chord "1" and the beginning location of the chord "13".

The included angle of two radii extending from the center of the circular member 44 to the aforesaid peripheral beginning locations of the chords "1" and "13" can be ten degrees, by way of example. In that instance, there will be thirty-six chords on the outer face of each of the circular members 44 and 46 when twelve "sets" of the twelve chords and lines have been formed. Similarly, there will be thirty-six of the bridging lines 36 and thirty-six of the bridging lines 38 extending in opposite diagonal directions between the circular members 44 and 46.

These twelve "sets" on the ten degree spacing constitute one complete "cycle", so to speak, in which the chords are displaced uniformly around the entire peripheries of both of the circular members 44 and 46, with the first "set" of the twelve chords and bridging lines shown being repeated eleven more times. Of course, the entire cycle can be repeated to form additional chords and briding lines over those of the first cycle, if desired.

It also will be understood that the peripheral displacement of the adjacent chords and lines on the periphery of each of the circular members 44 and 46 can be other than ten degrees. Thus, the adjacent positions of the elongate element can be continuous so that the angle will be less than one degree and the spacing can be increased until the angle is preferably not more than thirty degrees. However, the angle can be as much as ninety degrees and a functional joint will still result. Generally the spacing can be greater where the torque requirements are smaller or where heavier elongate elements are employed.

In additon, while the peripheral displacement of the bridging lines from one large diameter portion to the next, as shown in FIGS. 1-4, is approximately 120°, this angle can be from 30° to 150°. However, angles between 90° and 120° appear to be the most satisfactory. The smaller angles are more practical where torque requirements are lower. Further, the bridging lines may extend in only one direction if torque is only applied in one direction.

Figure 5:
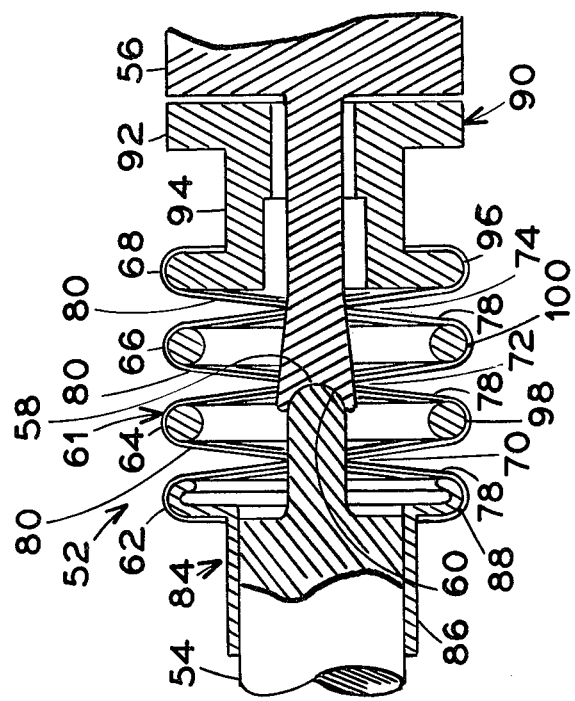
FIG. 5 is a schematic view in longitudinal cross section of a modified constant velocity universal joint embodying the invention.
Figure 6:
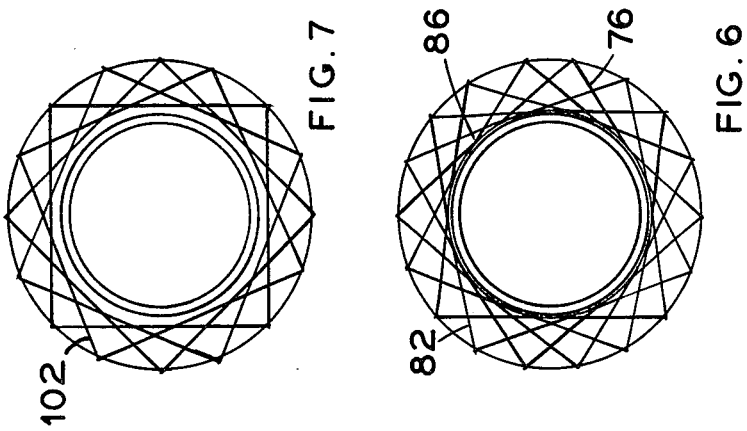
FIG. 6 is a left end view of the universal joint of FIG. 5.

FIGS. 5 and 6 schematically show a somewhat modified universal joint 52 which connects two shafts 54 and 56, of different diameters in this instance. The shafts have extensions terminating in a ball 58 and a socket 60 cooperating with one another near the center of the universal joint 52. These assure that the two shafts do not become axially offset, although they permit angular misalignment. Any suitable centering device can be employed, such as that shown in U.S. Pat. No. 3,678,707, by way of example. However, the joint 52 can accommodate some axial offset of the shafts 54 and 56 if the centering device is not used.

The centering devices can be used when more than two large diameter portions are employed on the bodies of the constant velocity universal joints. However, with a joint having only two large diameter portions, the opposite diagonally-extending bridging lines, such as the lines 36 and 38 of FIGS. 1-3, prevent axial offset of the two connected shafts so that no centering device is required.

The constant velocity universal joint 52 differs from the joint 20 in several respects. The joint 52 includes a body 61 having four large diameter portions 62, 64, 66, and 68 and three smaller diameter portions 70, 72, and 74 therebetween. The principal advantages of the additional large portions is that the shafts 54 and 56 can be misaligned angularly to a greater extent, to 45° or more, in contrast to 5°-10° for the shafts 22 and 24 employed with the universal joint 20. A continuous elongate element 76 can be employed to form bridging portions or lines 78 extending diagonally in one direction and bridging portions or lines 80 extending diagonally in the other direction. Anchor portions or chords 82 are formed at the ends of the universal joint body.

In this instance, the left end of the universal joint 52 has a shaft connection 84 which comprises an outer hub 86 and an annular flange 88. The hub 86 is received over and suitably affixed to, as by pinning, the shaft 54 after the universal joint body 61 is formed. The flange 88 serves as part of the core by forming the large diameter portion 62 of the universal joint body 61 and the flange 88 also subsequently serves as part of the connection for the shaft 54.

At the right end of the universal joint 52 is another shaft connection 90 which includes a larger hub 92 and a smaller hub 94, with the smaller hub 94 terminating in an annular flange 96. The flange 96 serves as part of the core by forming the large diamater portion 68 of the universal joint body 61 and the flange 96 also serves as part of the connection for the shaft 56 to which the large hub 92 is suitably affixed, as by welds or machine screws. The core for the universal joint body also consists of two rings 98 and 100 corresponding to the two large diameter portions 64 and 66.

When the universal joint body 61 of FIG. 5 is to be formed, a temporary shaft is extended through the shaft connections 84 and 90 with the circular members or rings 98 and 100 having means temporarily centering and positioning them on this shaft. After the elongate element 76 is wound on the core consisting of the temporary shaft with the flanges 88 and 96 and the rings 98 and 100 to form the universal joint body 61, the temporary shaft is removed as from the left end through the connection 84 along with the temporary supports for the rings 98 and 100 which then remain as part of the universal joint 52. Subsequently, as when the universal joint 52 is to replace an existing universal joint, the shaft connection 84 can be affixed to the shaft 54 of the existing drive train and, similarly, the shaft connection 90 can be affixed to the shaft 56 of the drive train, provided those shafts are equipped with suitable centering devices such as the ball 58 and the socket 60. Otherwise, the shafts can be modified or replaced so as to be equipped with centering devices.

Particularly with the large hub 86 of the shaft connection 84, the chords 82, as viewed in FIG. 6, do not extend in a straight line from one peripheral edge of the large diameter portion 62 to the other, but, rather, curve around a portion of the hub. This is not material, however, as long as the chords are effective to anchor the ends of the bridging lines 78 and 80.

Figure 7:
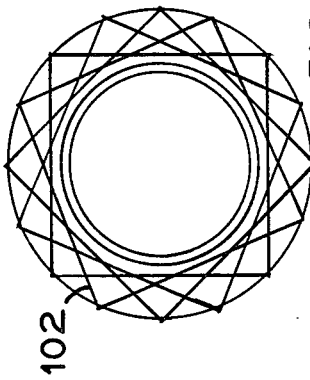
FIG. 7 is a left end view of a modified universal joint similar to that of FIGS. 5 and 6, but with the elongate element wound at a different angle and with different spacing.

The elongate element 76 of FIGS. 5 and 6 has the 120 degree angles with the ten degree spacing on each of the large diameter portions 62-68 for the chords and lines. FIG. 7 shows a view of a universal joint similar to FIG. 6 with the exception that chords indicated at 102 are located at 90 degree angles and have a spacing of 22¼° on the peripheral edge, rather than ten degrees. In this instance, with the smaller angle between the chords and bridging lines, the diameter of the small diameter portions of the universal joint body will correspondingly be larger than with 120° angles, as viewed from the front of the joint or in cross section. The diameter of the small diameter portions are also affected by the spacing between the large diameter portions.

Figure 8:
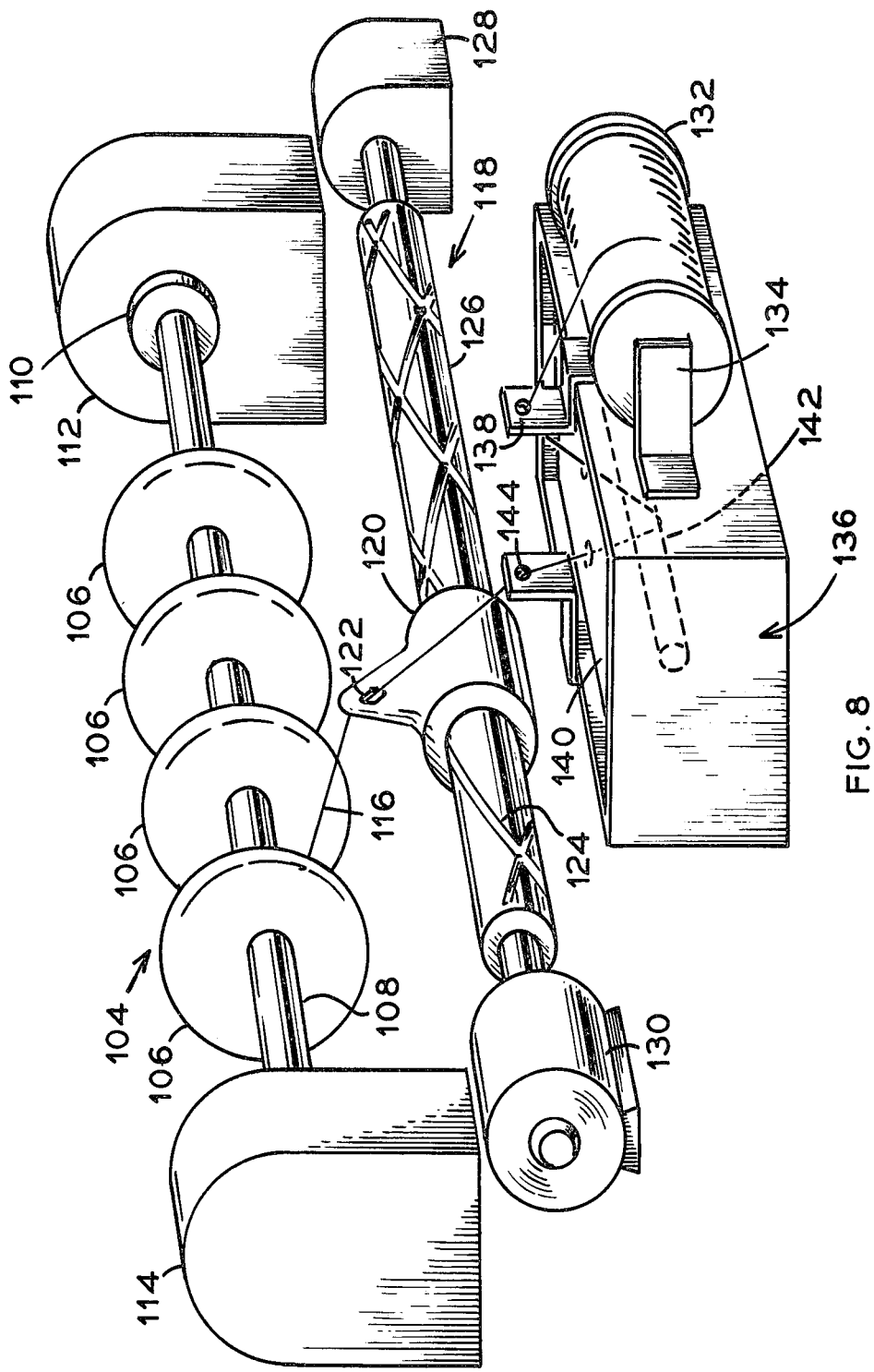
FIG. 8 is a schematic view in perspective of apparatus for producing the universal joint shown in FIGS. 5–7.

FIG. 8 schematically shows apparatus for producing a universal joint body similar to that of FIG. 5. Here, a core 104 consists of four circular members 106 which correspond to four large diameter portions of the universal joint body. The circular members 106 are mounted on a temporary shaft 108 which is rotatably held in a bearing 110 in a housing 112 at one end and rotated by a motor located in a housing 114 at the other end. The circular members 106 are temporarily affixed to the temporary shaft 108 and are mounted so that the shaft can be removed when the universal joint body is completed. The bridging lines and chords for the body are formed by a continuous elongate element 116. The element 116 is moved back and forth between two positions just beyond the outer faces of the outermost circular elements 106 as the elements are rotated. It will be understood that the rate of transverse movement of the elongate element 116 and rate of rotation of the circular members 106 can produce an almost inifinite number of angles and spacing for the resulting bridging lines and chords.

In this instance, the elongate element 116 is transversely moved by a level wind device 118. This consists of a traveling sleeve 120 having a guide eye 122 and an internal follower (not shown) which rides in a suitable helical groove 124 formed in a cylinder 126. The cylinder has one end held in a bearing housing 128 and is rotated by a motor 130. As the cylinder rotates, the traveling sleeve 120 moves back and forth between the desired end positions as determined by the cooperation of its follower and the helical groove 124. The groove 124 as shown, of course, is only schematic and would, in actuality, have a much smaller lead angle on a cylinder larger than the cylinder 126.

The elongate element 116 is supplied from a spool 132 rotatably mounted on brackets 134 attached to a container 136. The element 116 is led through a stationary eye 138 into a pool 140 of coating material and moves around a submerged guide rod 142 and to another stationary eye 144. From here, the coated element 116 moves through the eye 122 of the sleeve 120 and to the core. The coating material preferably does not harden until the element is applied on the core so that the coating can become affixed to other coated portions of the elements and form an integral body.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A universal joint for transmitting torque from one shaft to another at substantially constant angular velocity, said universal joint comprising a first member having means for attaching a central portion thereof to one of said shafts, a second member having means for attaching a central portion thereof to the other of said shafts, said members being in spaced relationship and positioned to rotate in substantially parallel planes perpendicular to the axes of said shafts when said shafts are aligned, a body which is substantially circular in transverse cross section and has one end connected to said first member and another end connected to said second member, said body having at least one intermediate portion of large diameter between said members and at least one portion of smaller diameter between said large diameter intermediate portion and each of said members, said body comprising a multiplicity of bridging lines, said lines extending from first points on the periphery of one of said members to second points on the periphery of the other of said members, said second points being peripherally displaced in a clockwise direction from said first points as viewed from one end of the universal joint, and said body further comprising an additional multiplicity of bridging lines, the last-mentioned lines extending from third points on the periphery of said one member to fourth points on the periphery of said other member, said fourth points being peripherally displaced in a counterclockwise direction from said third points as viewed from the same end of the universal joint.

2. A universal joint for transmitting torque from one shaft to another at substantially constant angular velocity, said universal joint comprising a first member having means for attaching a central portion thereof to one of said shafts, a second member having means for attaching a central portion thereof to the other of said shafts, said members being in spaced relationship and positioned to rotate in substantially parallel planes perpendicular to the axes of said shafts when said shafts are aligned, a body which is substantially circular in transverse cross section and has one end connected to said first member and another end connected to said second member, said body having at least one intermediate portion of large diameter between said members and at least one portion of smaller diameter between said large diameter intermediate portion and each of said members, said body comprising a multiplicity of bridging lines of graphite filaments covered with a hardened coating material, said lines extending from first points on the periphery of one of said members to second points on the periphery of the other of said members, said second points being peripherally displaced in a clockwise direction from said first points as viewed from one end of the universal joint, and said body further comprising an additional multiplicity of bridging lines of graphite filaments covered with a hardened coating material, the last-mentioned lines extending from third points on the periphery of said one member to fourth points on the periphery of said other member, said fourth points being peripherally displaced in a counterclockwise direction from said third points as viewed from the same end of the universal joint.

3. A universal joint for transmitting torque from one shaft to another at substantially constant angular velocity, said universal joint comprising a body which is substantially circular in transverse cross section and has one end connected to one shaft and another end connected to another shaft, said body having at least two outer portions of large diameter, at least one intermediate portion of large diameter, and at least one portion of smaller diameter between said large diameter intermediate portion and each of said large diameter outer portions, said body comprising a multiplicity of bridging lines, said lines extending from first points on the periphery of one of said large diameter outer portions to second points on the periphery of the other of said large diameter outer portions, said second points being peripherally displaced in a clockwise direction from said first points as viewed from one end of the universal joint, and said body further comprising an additional multiplicity of bridging lines, the last-mentioned lines extending from third points on the periphery of said one large diameter outer portion to fourth points on the periphery of said other large diameter outer portion, said fourth points being peripherally displaced in a counterclockwise direction from said third points as viewed from the same end of the universal joint.

4. A universal joint according to claim 3 characterized by said multiplicity of bridging lines and said additional multiplicity of bridging lines being made of a continuous element.

5. A universal joint for transmitting torque from one shaft to another at substantially constant angular velocity, said universal joint comprising a body which is substantially circular in transverse cross section and has one end connected to one shaft and another end connected to another shaft, said body having at least two outer portions of large diameter, at least one intermediate portion of large diameter, and at least one portion of smaller diameter between said large diameter intermediate portion and each of said large diameter outer portions, said body comprising a multplicity of tows of from 2,000 to 10,000 graphite fibers covered with a hardened coating material, said tows extending from first points on the periphery of one of said large diameter outer portions to second points on the periphery of the other of said large diameter outer portions, said second points being peripherally displaced in a clockwise direction from said first points as viewed from one end of the universal joint, and said body further comprising an additional multiplicity of tows of from 2,000 to 10,000 graphite fibers covered with a hardened coating material, the last-mentioned tows extending from third points on the periphery of said one large diameter outer portion to fourth points on the periphery of said other large diameter outer portion, said fourth points being peripherally displaced in a counterclockwise direction from said third points as viewed from the same end of the universal joint.

6. A universal joint for transmitting torque from one shaft to another shaft, said universal joint comprising a first member having a circular periphery, means for attaching the central portion of said first member to one of said shafts, a second member having a circular periphery, means for attaching the central portion of said second member to the other of said shafts, a first plurality of bridging lines having first ends attached at first points substantially uniformly spaced around the periphery of said first member, said first plurality of said bridging lines having second ends attached at second points substantially uniformly spaced around the periphery of said second member, said second points being peripherally displaced from said first points in a clockwise direction as viewed from one end of said universal joint, and a second plurality of bridging lines having first ends attached at third points substantially uniformly spaced around the periphery of said first member and having second ends attached at fourth points substantially uniformly spaced around the periphery of said second member, with said fourth points of said second plurality being displaced from said third points of said second plurality in a counterclockwise direction when viewed from the same end of said universal joint, said first and said second plurality of bridging lines extending in generally undulating configurations between said first and second members to form at least one intermediate large diameter portion between said first and second members.

7. A universal joint for transmitting torque from one shaft to another shaft, said universal joint comprising a first member having a circular periphery, means for attaching the central portion of said first member to one of said shafts, a second member having a circular periphery, means for attaching the central portion of said second member to the other of said shafts, a first plurality of tows of from 2,000 to 10,000 graphite fibers covered with a hardened coating material, having first ends attached at first points substantially uniformly spaced around the periphery of said first member, said first plurality of said tows having second ends attached at second points substantially uniformly spaced around the periphery of said second member, said second points being peripherally displaced from said first points in a clockwise direction as viewed from one end of said universal joint, and a second plurality of tows of from 2,000 to 10,000 graphite fibers covered with a hardened coating material, having first ends attached at third points substantially uniformly spaced around the periphery of said first member and having second ends attached at fourth points substantially uniformly spaced around the periphery of said second member, with said fourth points of said second plurality being displaced from said third points of said second plurality in a counterclockwise direction when viewed from the same end of said universal joint, said first and said second plurality of graphite tows extending in generally undulating configurations between said first and second members to form at least one intermediate large diameter portion between said first and second members.

8. A universal joint for transmitting torque from one shaft to another shaft, said universal joint comprising a body having a first large portion having a circular periphery, a second large portion having a circular periphery, and a third large portion having a circular periphery and located between said first and said second large portions, means for attaching said body to said shafts, a first plurality of elongate members connecting the periphery of said first portion to the periphery of said second portion and being positioned around the entire peripheries of both of said portions, and a second plurality of elongate members extending in the same direction as the first elongate members from the periphery of said second portion to the periphery of said first portion and being positioned around the entire peripheries of both of said first and second portions, the members of said first plurality crossing and contacting adjacent members of said second plurality at said third large portion and at angles which are symmetrical with respect to the axes of said shafts when in coaxial relationship.

9. A universal joint according to claim 8 characterized by said members being substantially covered with a hardened coating material.

10. A universal joint for transmitting torque from one shaft to another shaft, said universal joint comprising a body having a first large portion having a circular periphery, a second large portion having a circular periphery, and a third large portion having a circular periphery and located between said first and said second large portions, means for attaching said body to said shafts, a first plurality of graphite filaments covered with a hardened coating material connecting the periphery of said first portion to the periphery of said second portion and being positioned around the entire peripheries of both of said portions, and a second plurality of graphite filaments covered with a hardened coating material extending in the same direction as the first graphite filaments from the periphery of said second portion to the periphery of said first portion and being positioned around the entire peripheries of both of said first and second portions, the filaments of said first plurality crossing and contacting adjacent filaments of said second plurality at said third large portion and at angles which are symmetrical with respect to the axes of said shafts when in coaxial relationship.

11. A universal joint comprising a first circular member and a second circular member arranged in spaced relationship, a first plurality of graphite fibers having first portions attached at first points substantially uniformly spaced around the periphery of said first member, said first plurality of graphite fibers having second portions attached at second points substantially uniformly spaced around the periphery of said second member, with said second points being peripherally displaced from said first points in a clockwise direction as viewed from one end of said universal joint, said first plurality of graphite fibers extending in generally undulating configurations between said first and second members, a second plurality of graphite fibers having first portions attached at third points substantially uniformly spaced around the periphery of said first member and having second portions attached at fourth points substantially uniformly spaced around the periphery of said second member, with said fourth points being peripherally displaced from said third points in a counterclockwise direction as viewed from the same end of said universal joint, said second plurality of graphite fibers extending in generally undulating configurations between said first and second members, graphite fibers of said second plurality crossing and contacting adjacent graphite fibers of said first plurality at angles which are symmetrical with respect to the axes of said circular members when in coaxial relationship, with the crossing and contacting portions of said graphite fibers of said first and said second pluralities forming at least one large diameter portion of the universal joint and smaller diameter portions between said large diameter portion and said first and second members.

* * * * *